(12) United States Patent
Saito

(10) Patent No.: US 7,116,099 B2
(45) Date of Patent: Oct. 3, 2006

(54) ANGULAR POSITION SENSOR AND ROTATION CONTROL DEVICE

(75) Inventor: Masashi Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 10/845,158

(22) Filed: May 14, 2004

(65) Prior Publication Data
US 2004/0232908 A1 Nov. 25, 2004

(30) Foreign Application Priority Data
May 19, 2003 (JP) .............................. 2003-140508

(51) Int. Cl.
*G01B 7/30* (2006.01)
*G01P 3/487* (2006.01)
*G01P 3/42* (2006.01)

(52) U.S. Cl. .................................. 324/207.25; 324/174

(58) Field of Classification Search ............... 324/212, 324/225, 207.15, 207.2, 207.21, 207.25, 324/207.26, 207.24, 222, 251, 252, 173, 324/174, 178, 179, 223
See application file for complete search history.

(56) References Cited

U.S. PATENT DOCUMENTS

| 6,181,410 | B1 * | 1/2001 | Ishida et al. ............... 356/4.01 |
| 6,651,622 | B1 * | 11/2003 | Yanagii ...................... 123/399 |
| 6,697,680 | B1 * | 2/2004 | Lin et al. ...................... 700/13 |
| 6,759,824 | B1 * | 7/2004 | Kawabata et al. .......... 318/436 |
| 6,946,831 | B1 * | 9/2005 | Miyata et al. ......... 324/207.25 |
| 6,957,173 | B1 * | 10/2005 | Motz .......................... 702/189 |

FOREIGN PATENT DOCUMENTS

JP 2002-213993 7/2002

* cited by examiner

*Primary Examiner*—Edward Lefkowitz
*Assistant Examiner*—Kenneth J. Whittington
(74) *Attorney, Agent, or Firm*—Crowell & Moring LLP

(57) ABSTRACT

An angular position sensor has a sensor element detects changes of magnetic field strength of a magnet that rotates in synchronization with a rotating body, for detecting its angular position. A circuit is provided for compensating hysteresis characteristics of an output of the sensor element in both the clockwise and counterclockwise rotation directions, using different coefficients for compensation approximated by different functions, depending on whether said rotating body rotates clockwise or counterclockwise.

14 Claims, 7 Drawing Sheets

FIG. 3
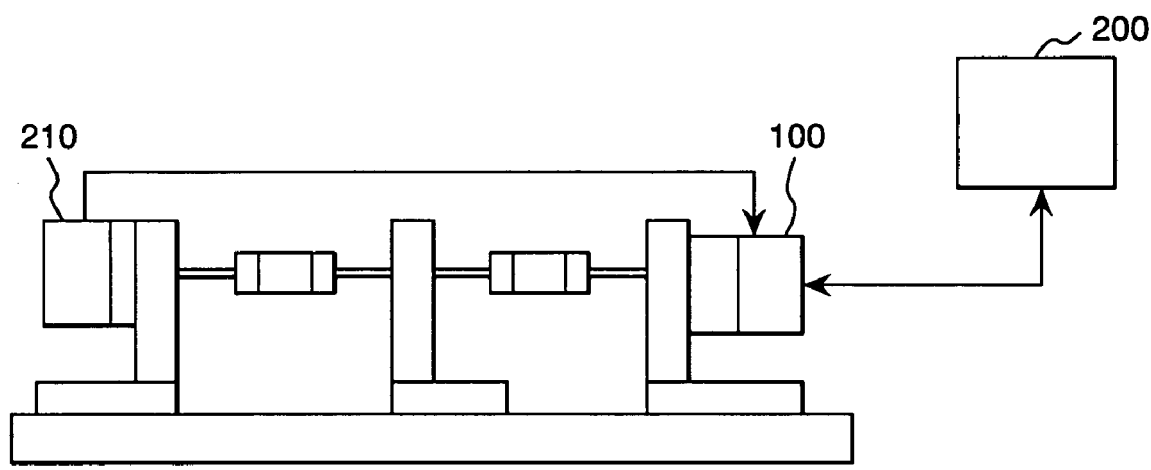
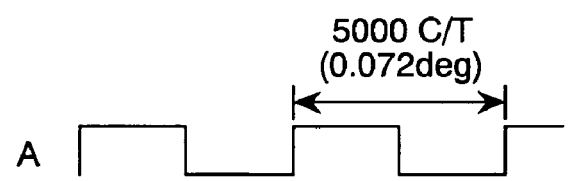
FIG. 4a  A
FIG. 4b  B
FIG. 4c  Z

ANGULAR POSITION SENSOR AND ROTATION CONTROL DEVICE

BACKGROUND OF THE INVENTION

The present invention relates to an angular position sensor for detecting the angular position of a rotation body and a control device for rotation using the sensor.

In a conventional non-contact angular position sensor, for example, as described in Japanese Laid-Open Patent Publication No. 2002-213993, it is known that to prevent a magnetic detection element from directly detecting an effect of magnetization generated in an undetected member by electromagnetic induction, the flow of a magnetic line of force flowing through the undetected member and the flow of a magnetic line of force flowing through the magnetic detection element are made independent of each other.

SUMMARY OF THE INVENTION

However, the sensor described in Japanese Application Patent Laid-Open Publication No. 2002-213993 does not give consideration to hysteresis caused by a difference in the rotational direction of an undetected member. A problem arises that when hysteresis characteristics are provided, the detected angular value varies with the rotational direction, so that errors are caused in the detected angular value. Here, hysteresis is caused, since the rotational direction of an undetected member is different, i) by a difference in the flow direction of a current for driving rotation of the undetected member, ii) by a difference in the relative location between a detected member and a magnetic detection element, and iii) by a difference in the resistance change to the magnetic field change of the magnetic detection element.

Further, in a rotation control device for detecting the angular position using a non-contact angular position sensor and controlling a non-rotation body on the basis of the detected angular position, when errors are caused in the detected angular value, a problem arises that the angular position control accuracy is reduced.

An object of the present invention is to provide a non-contact angular position sensor reducing errors in the detected angular value without being affected by hysteresis characteristics.

Further, another object of the present invention is to provide a rotation control device with improved control accuracy using a non-contact angular position sensor reducing errors in the detected angular value.

(1) To accomplish the above object, in the present invention, an angular position sensor having a sensor element for detecting changes of the magnetic field strength of a magnet rotating in synchronization with a rotation body for detecting the angular position of the rotation body has a compensation means for compensating, when the rotation body rotates clockwise and counterclockwise, so as to make the outputs of the sensor element different.

By use of such a constitution, errors in the detected angular value can be reduced without being affected by hysteresis characteristics.

(2) In (1) mentioned above, the compensation means preferably compensates for the outputs of the sensor element using compensation coefficients approximated by polynomial functions which differ when the rotation body rotates clockwise and counterclockwise.

(3) In (4) mentioned above, the compensation means preferably compensates for the outputs of the sensor element using coefficients for compensation approximated by using different cubic functions when the rotation body rotates clockwise and counterclockwise.

(4) In (2) mentioned above, the compensation means preferably compensates for the outputs of the sensor element using coefficients for compensation approximated by using a linear function when the rotation body rotates clockwise and counterclockwise.

(5) In (2) mentioned above, the sensor element preferably has outputs of two systems and the compensation means preferably compensates for the outputs of the sensor element using coefficients for compensation when the outputs of the two systems are divide and approximated using a polynomial function when the rotation body rotates clockwise and counterclockwise.

(6) In (1) mentioned above, the compensation means preferably compensates for the outputs of the sensor element using approximated sensor outputs with the same function and compensated values different for each rotational direction.

(7) In (11) mentioned below, the control means preferably decides the rotational direction by a command value for motor drive for rotation of the rotation body.

(8) In (11) mentioned below, the control means preferably decides the rotational direction by an output current of a motor driver circuit for driving rotation of the rotation body.

(9) In (11) mentioned below, the control means preferably decides the rotational direction by an output voltage of a motor driver circuit for driving rotation of the rotation body.

(10) In (11) mentioned below, the control means preferably decides the rotational direction by a change with time of an output signal of the sensor element.

(11) To accomplish the above another object, in the present invention, a position control device having a motor for driving a rotation body, a sensor element for detecting changes of the magnetic field strength of a magnet rotating in synchronization with the rotation body, and a control means for controlling the motor so that the rotation angle of the rotation body detected by the sensor element becomes a desired angle has a compensation means for compensating, when the rotation body rotates clockwise and counterclockwise, so as to make the outputs of the sensor element different and the control means controls the motor so that the rotation angle compensated by the compensation means becomes the desired angle.

By use of such a constitution, the rotation control accuracy can be improved.

BRIEF DESCRIPTION OF DRAWINGS

FIG. 3 is a system configuration diagram showing the constitution of a calibration device used in the rotation control device of an embodiment of the present invention;

FIG. 4 is a waveform diagram of an output pulse of a rotary encoder of the calibration device used in the rotation control device of an embodiment of the present invention;

DESCRIPTION OF THE PREFERRED EMBODIMENTS

The constitution of the non-contact angular position sensor and the position control device using the sensor of an embodiment of the present invention will be explained below with reference to FIGS. 1 to 12.

Firstly, by referring to FIG. 1, the constitution of the position control device of this embodiment will be explained.

Figure 1:
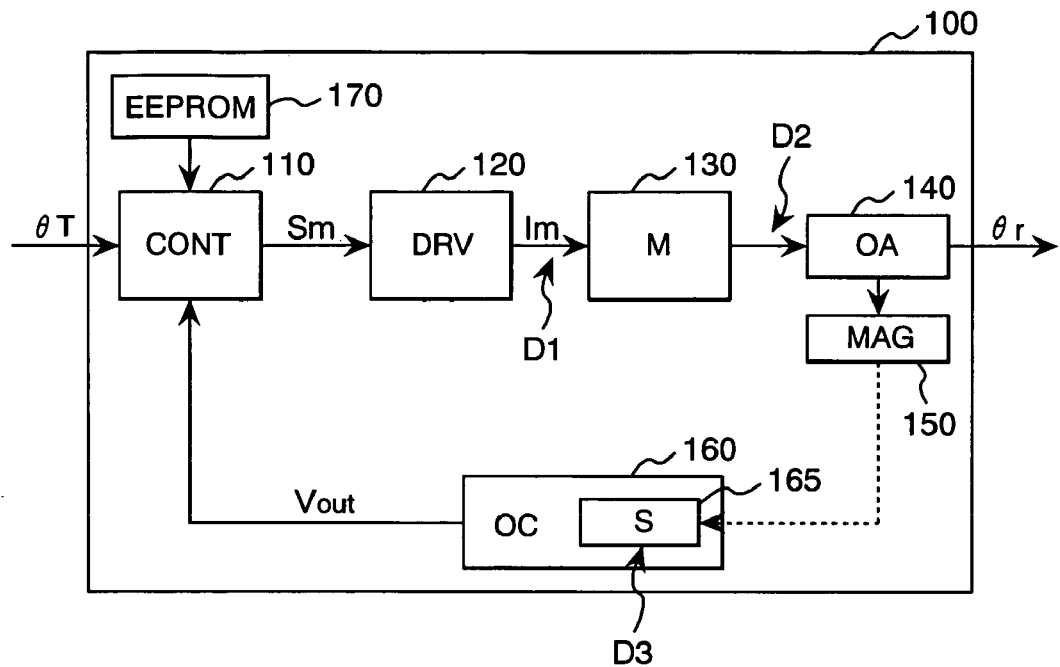
FIG. 1 is a block diagram showing the constitution of the rotation control device of an embodiment of the present invention.

FIG. 1 is a block diagram showing the constitution of the position control device of an embodiment of the present invention.

In this embodiment, an example that the position control device is applied to a 2-wheel drive/4-wheel drive switching shift controller will be explained. The shift controller is a control device of a transfer case for switching the driving state of a car. The shift controller has a function, on the basis of a command value of the driving state such four-wheel drive or two-wheel drive which is input from a driver or an external controller, for driving a motor inside the shift controller, rotating a shift rail, and switching gears inside the transfer case.

A shift controller 100 has a controller (CONT) 110, a motor driver (DRV) 120, a motor (M) 130, an output shaft (OA) 140, a magnet (MAG) 150, an output circuit (OC) 160, a sensor element (S) 165, and an EEPROM 170.

The controller 110, so that the rotation angle of the output shaft 140 becomes a desired angle θT externally instructed, outputs a motor drive command Sm to the motor driver 120. In the calculation method of a motor drive command value, there are On-Off control, P control, PID control, H∞ control, and H2 control available. As a physical amount of this command value, there are a current for driving the motor 130 and a duty ratio of PWM control.

The motor driver 120 outputs a motor current Im according to the input motor drive command Sm to the motor 130. The motor driver 120 is formed by an H bridge circuit composed of MOSFET or a relay circuit. The motor 130 is rotated by the motor current Im and the rotation output thereof is transferred to the output shaft 140 via a reduction mechanism not shown in the drawing. The output shaft 140 rotates clockwise or counterclockwise, for example, within the range from 0° to 360°. When the rotation angle is, for example, 0°, 2-wheel drive is selected, and when the rotation angle is 90°, high-speed 4-wheel drive is selected, and when the rotation angle is 180°, low-speed 4-wheel drive is selected. When the rotation angle of the output shaft 140 is changed like this, 2-wheel drive or 4-wheel drive is selected.

When the output shaft 140 is rotated, the magnet (Mag) 150 is rotated in synchronization with the rotation. In the neighborhood of the magnet 150, the sensor element 165 like a hall device which is a non-contact magnetic detection element is arranged. By the rotation of the magnet 150, the magnetic flux density in the neighborhood of the sensor element 165 is changed and by the change of the magnetic flux density, the resistance of the sensor element 165 is changed. As a material of the magnet 150, samarium cobalt, neodymium, or SmFeN may be considered. However, it is decided according to the material shape and characteristics of the magnetic sensor element 165. In this embodiment, in consideration of the temperature characteristics of the magnet 150 and magnetic flux density, an SmFeN magnet is used.

The output circuit 160 outputs an output voltage Vout corresponding to changes of the resistance of the sensor element 165. The sensor element 165 is composed of, for example, a giant magneto resister (GMR) element having four bias magnetic fields. The output circuit 160 outputs a first output V0 by the first and second GMR elements and outputs a second output V1 by the third and fourth GMR elements. The output circuit 160 has a bridge circuit and an amplifier. On the first and second sides of the bridge circuit, the first and second GMR elements are respectively arranged, and on the third and fourth sides, fixed resistors are arranged, thus changes of the resistance of the GMR elements can be converted to changes of the voltage. The converted voltage is amplified by the amplifier to the output voltage Vout.

Next, by referring to FIG. 2, the relationship between the rotation angle θr of the output shaft 140 and the output voltage Vout of the output circuit 160 will be explained.

Figure 2:
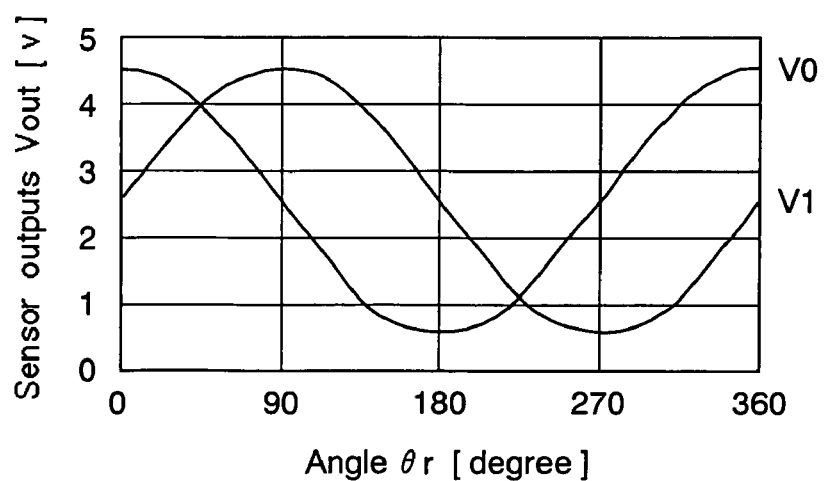
FIG. 2 is a characteristic diagram showing the relationship between the rotation angle θr of the output shaft 140 and the output voltage Vout of the output circuit 160 in the rotation control device of an embodiment of the present invention.

FIG. 2 is a characteristic diagram showing the relationship between the rotation angle θr of the output shaft 140 and the output voltage Vout of the output circuit 160 in the rotation control device of an embodiment of the present invention.

In FIG. 2, the axis of abscissa indicates the rotation angle θr of the output shaft 140 and the axis of ordinate indicates the output voltage Vout of the output circuit 160.

The output voltage V0, when the output shaft 140 is changed from 0° to 360°, is changed in a sine wave shape as shown in the drawing. One rotation of 360° of the output shaft 140 is equivalent to one period of the output voltage V0. Here, the output voltage V0, when the rotation angle θr is 0°, indicates a maximum value and when the rotation angle θr is 180°, it indicates a minimum value. The output voltage V1, in the same way as with the output voltage V0, when the output shaft 140 is changed from 0° to 360°, is changed in a sine wave shape. One rotation of 360° of the output shaft 140 is equivalent to one period of the output voltage V1. Here, the output voltage V1, when the rotation angle θr is 90°, indicates a maximum value and when the rotation angle θr is 270°, it indicates a minimum value. By use of the GMR elements having a bias magnetic field as a non-contact magnetic detection element, as shown in the drawing, two kinds of output voltages Vout having a phase shifted by 90° can be obtained. Further, when GMR elements having no bias magnetic field or magnetic resistor (MR) elements are used, for one rotation of the magnet 150, a waveform of two periods may be observed. As a sensor element, a hall device, if it reacts to magnetism, can be used.

As shown in FIG. 1, the output voltage Vout outputted by the output circuit 160 is input to the controller 110 again. The controller 110, on the basis of the output voltage Vout, obtains the rotation angle θr of the output shaft 140. And, the controller 110, so that the detected rotation angle θr of the output shaft 150 becomes a desired rotation angle θT, outputs the motor drive command Sm to the motor driver 120. In this case, as described later, between the rotation angle θr of the output shaft 140 and the output voltage Vout of the output circuit 160, there are hysteresis characteristics. Namely, a phenomenon appears that when the output shaft 140 rotates clockwise and counterclockwise, for the same rotation angle θr of the output shaft 140, the output voltage Vout is different.

Therefore, in this embodiment, the EEPROM 170 has a compensation coefficient for compensating for the hysteresis characteristics of the sensor element 165. The controller 110 reads the compensation coefficient from the EEPROM 170, compensates for the output voltage Vout using the compensation coefficient, obtains the rotation angle θr of the output shaft 140 in which the effect of the hysteresis is reduced, and drives the motor 130.

As a factor for causing the hysteresis characteristics by the output voltage of the sensor element, the following three disturbances may be cited. Namely, they are, as shown in FIG. 1, 1) a disturbance D1 due to a disturbed magnetic field by the motor drive current, 2) a disturbance D2 due to a gap of the slideway of the output shaft, and 3) a disturbance D3 due to the hysteresis of the sensor element itself. The respective disturbances will be briefly explained below.

The disturbance D1 is caused by the motor drive current. The controller (CONT) 110, the motor driver (DRV) 120, the output circuit (OC) 160, the sensor element (S) 165, and the EEPROM 170 which are shown in FIG. 1 are arranged on the same wiring substrate. The motor drive current Im outputted from the motor driver 120 is supplied to the motor 150 from an external terminal of the substrate via a lead wire.

In this case, when the motor 150 is rotated clockwise and when it is rotated counterclockwise, the flowing path of the motor drive current Im flowing on the substrate is different and the flowing direction is also opposite. Therefore, the direction of the magnetic field due to the electromagnetic induction of the motor drive current generated during the clockwise rotation and the direction of the magnetic field due to the electromagnetic induction of the motor drive current generated during the counterclockwise rotation are different from each other, so that the output of the magnetic sensor element 165 varies with the rotation direction of the output shaft 140. As a result, the output voltage for the sensor element 165 has the hysteresis characteristics.

The disturbance D2 is caused by a gap of the slideway. Between the output shaft 140 and the slideway for supporting rotation of the output shaft, a gap must be formed. Due to the existence of the gap, variation states are generated that the output shaft moves up and down in the axial direction, or the rotation axis of the output shaft moves in parallel in the radial direction, or the output shaft inclines to the central axis of the slideway. These variation states are decided by external force from the motor 130, the shape of the reduction gear, and external force from a non-rotation body fit into the output shaft 140. Further, these variation states vary with the rotational direction and are uniquely decided if the rotational direction is decided. As a result, even when the output shaft passes the same angle, the relative location between the magnetic sensor element and the magnet varies with the rotational direction, so that the hysteresis characteristics are provided.

The disturbance D3 is caused by the hysteresis of the magnetic sensor element 165 to the magnetic field. Resistance changes of the magnetic resistor elements such as MR, AMR, and GMR have hysteresis for changes of the magnetic field. Particularly, the GMR elements are highly sensitive compared with the MR elements, though the hysteresis thereof is large. Therefore, the output of the magnetic sensor element has the hysteresis characteristics for the rotation angle of the magnet.

Next, by referring to FIGS. 3 to 8, the compensation method for hysteresis will be explained.

FIG. 3 is a system configuration diagram showing the constitution of a calibration device used in the rotation control device of an embodiment of the present invention. FIG. 4 is a waveform diagram of an output pulse of a rotary encoder of the calibration device used in the rotation control device of an embodiment of the present invention.

On the pedestal, the shift controller 100 and a rotary encoder 210 are attached. In this case, the output shaft of the shift controller 100 and the rotation axis of the rotary encoder 210 are attached so as to rotate synchronously with each other. The rotary encoder 210, as shown in FIG. 4, outputs signals A and B such that during one rotation of the output shaft, the phases of 5000 pulses differ from each other by one half pulse. Further, when the output shaft makes one rotation, a signal Z of one pulse is output.

The shift controller 100 and a host computer 200 are connected by CAN communication and transmit and receive data. Further, the output of the rotary encoder 210 is transmitted to the host computer 200 via the shift controller 100. In this case, the output of the rotary encoder 210 may be directly connected to the host computer 200.

The host computer 200 transmits a calibration start command to the shift controller 100. Upon receipt of the calibration start signal, the controller 110 transmits a motor drive signal to the motor driver 120 to rotate the motor 130. The motor 130 must rotate clockwise and counterclockwise. By rotation of the motor 130, the output shaft 140 rotates and the magnet 150 rotates in synchronization with the output shaft 140. By rotation of the magnet 150, the magnetic field passing through the magnetic sensor element 165 is changed and the output of the magnetic sensor element 165 is changed. As output of the magnetic sensor element 165, as shown in FIG. 2, signals V0 and V1 of two systems in which the phase is different by 90° from the rotation angle of the magnet 150 are output.

On the other hand, to calculate an absolute angle of the output shaft, the shift controller 100 calculates the rotation angle of the output shaft 140 from the output of the rotary encoder 210 and in synchronization with the output of the magnetic sensor element 165, transmits it to the host computer 200. Further, the shift controller 100 also transmits a signal for deciding the rotational direction of the rotation shaft, which will be described later, to the host computer 200 in synchronization with the signal of the magnetic sensor element 165. The signal for deciding the rotational direction of the rotation shaft may be directly input to the host computer 200.

Figure 5:
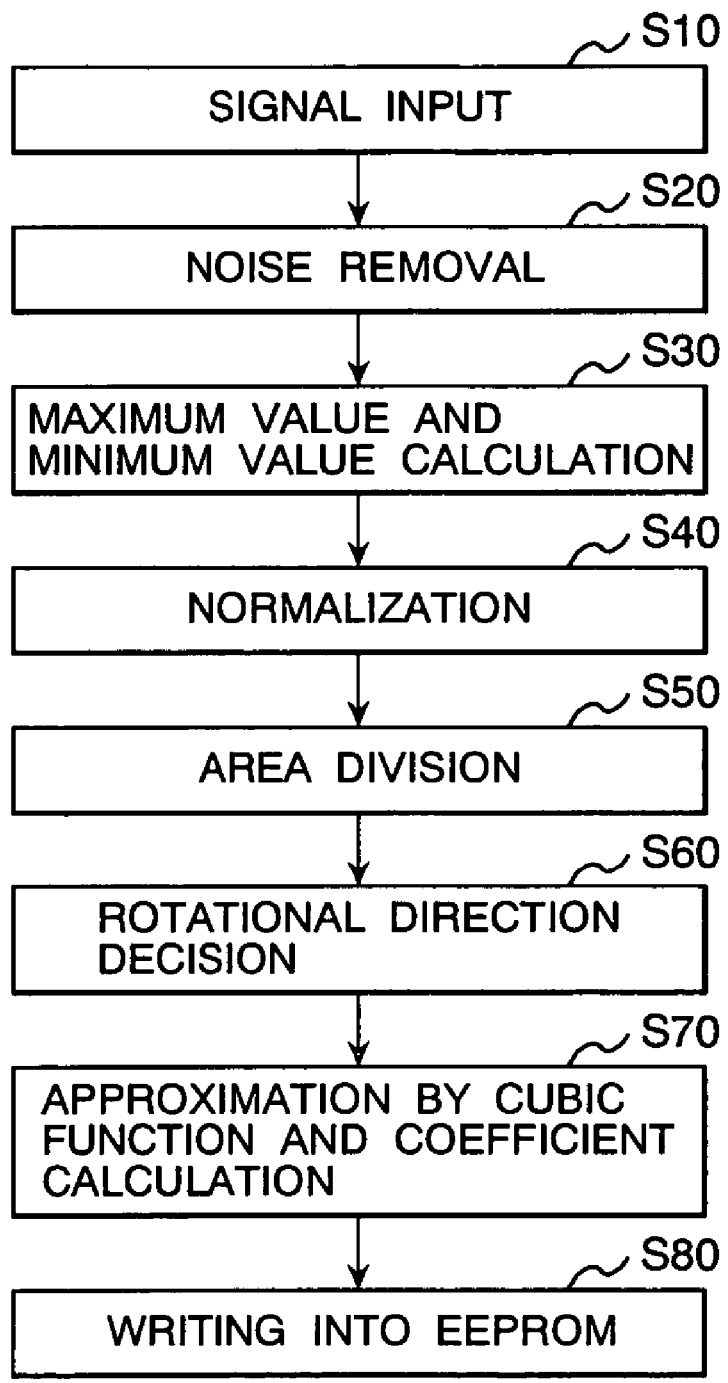
FIG. 5 is a flow chart showing the operation of the calibration device used in the rotation control device of an embodiment of the present invention.

Next, by referring to FIG. 5, the operation of the calibration device will be explained FIG. 5 is a flow chart showing the operation of the calibration device used in the rotation control device of an embodiment of the present invention.

At Step S10, to the host computer 200, the output of the magnetic sensor element 165 of two systems, the absolute angle of the rotation body calculated from the output of the rotary encoder 210, and the signal for deciding the rotational direction of the rotation body are input.

Next, at Step S20, the host computer 200 removes noise from the output of the magnetic sensor element 165 by a low-pass filter or an FIR or IIR filter.

Next, at Step S30, the host computer 200 calculates the maximum values V0max and V1max and the minimum values V0min and V1min of the two systems. The calculated maximum values and minimum values are transmitted from the host computer 200 to the shift controller 100 and are preserved in the EEPROM 170.

Next, at Step S40, the host computer 200, using the maximum values and minimum values calculated at Step S30, normalizes the outputs V0 and V1 using the following formulas (1) and (2).

$$V0\_normalized = \frac{V0 - (V0max + V0min)/2}{(V0max - V0min)/2} \quad (1)$$

$$V1\_normalized = \frac{V1 - (V1max + V1min)/2}{(V1max - V1min)/2} \quad (2)$$

Next, by referring to FIGS. 6 and 7, the outputs V0_normalized and V1_normalized which are normalized by the process at Step S40 will be explained.

Figure 6:
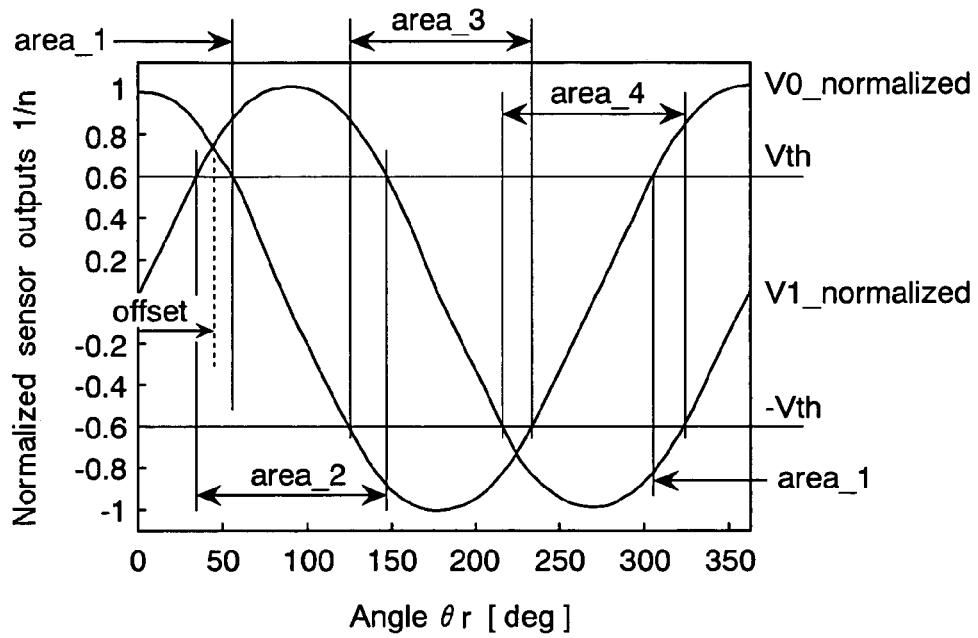
FIG. 6 is a waveform diagram of the normalized output during the calibration process in the rotation control device of an embodiment of the present invention.
Figure 7:
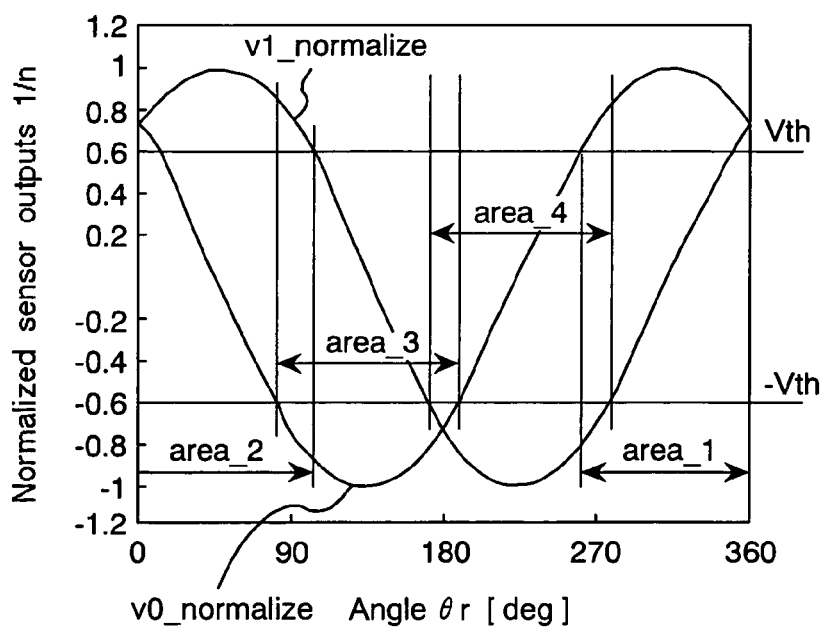
FIG. 7 is a waveform diagram of the normalized output during the calibration process in the rotation control device of an embodiment of the present invention.

FIGS. 6 and 7 are waveform diagrams of the outputs normalized at the time of the calibration process of the rotation control device of an embodiment of the present invention. In FIGS. 6 and 7, the axis of abscissa indicates the rotation angle θr of the output shaft and the axis of ordinate indicates the normalized output Vn.

For example, in the example shown in FIG. 2, the output Vout has a minimum value of about 0.5 V and a maximum value of about 4.5 V. However, as shown in FIG. 6, the amplitude range of the output of the magnetic sensor element 165 is normalized to ±1.0.

Next, at Step S50, the host computer 200, from the normalized outputs V0_normalized and V1_normalized, as indicated below, divides the rotation angle of the magnet 150 into an area 1 (area_1), an area 2 (area_2), an area 3 (area_3), and an area 4 (area_4) which are four angle areas.

Namely, the area 1 is a range of (V0_normalized>Vth), and the area 2 is a range of (V1_normalized>Vth), and the area 3 is a range of (V0_normalized≦-Vth), and the area 4 is a range of (V1_normalized≦-Vth).

Further, in FIG. 6, Vth=0.6 and it adopts a smaller value than V0_normalized which satisfies V0_normalized>0 and V0_normalized=V1_normalized. Therefore, as shown in FIG. 6, the angular areas are overlaid and the angle can be calculated continuously extending over 360°.

Further, in the state shown in FIG. 6, the area 1 is a range from 0° to 55° and a range from 305° to 360°, so that the angle is discontinuous. Therefore, when the formulas (1) and (2) are calculated straight, compensation calculations can be executed, though angular errors are increased.

Therefore, the zero point of the absolute angle calculated from the encoder is set to a maximum angle of the area 1. Namely, the maximum angle of the area 1 is set to an offset and the absolute angle y calculated from the output of the rotary encoder 210 is set to yoffset=(y−offset). Namely, the absolute angle is shifted and compensation calculations are executed. In the example shown in FIG. 6, the offset is 45°.

FIG. 7 shows the relationship of the absolute angle and the output of the magnetic sensor element 165 after the absolute angle is shifted. Further, the offset is necessary for the process of calculating the angle from the compensation coefficient, so that it is preserved in the EEPROM 170.

Next, at Step S60 shown in FIG. 5, the host computer 200, in the respective angular areas, decides the rotational direction of the magnet 150, that is, the output shaft 140. And, the host computer 200 divides the output state of the magnetic sensor element 165 into 8 groups.

The groups are respectively divided according to the definition indicated in Table 1 below. Here, the clockwise direction (CW) of the output shaft 140 means the direction in which the absolute angle calculated from the encoder output increases and the counterclockwise direction (CCW) of the output shaft 140 means the direction in which the absolute angle calculated from the encoder output decreases. Table 1 shows that, for example, the state of the outputs V0_normalized and V1_normalized is in the area 1, and when the output shaft 140 rotates clockwise, the output state of the magnetic sensor element 165 belongs to the group area_1_CW.

TABLE 1

| Area | Rotational direction of output shaft 16 | Group |
|---|---|---|
| area_1 | CW | area_1_CW |
| area_1 | CCW | area_1_CCW |
| area_2 | CW | area_2_CW |
| area_2 | CCW | area_2_CCW |
| area_3 | CW | area_3_CW |
| area_3 | CCW | area_3_CCW |
| area_4 | CW | area_4_CW |
| area_4 | CCW | area_4_CCW |

Figure 8:
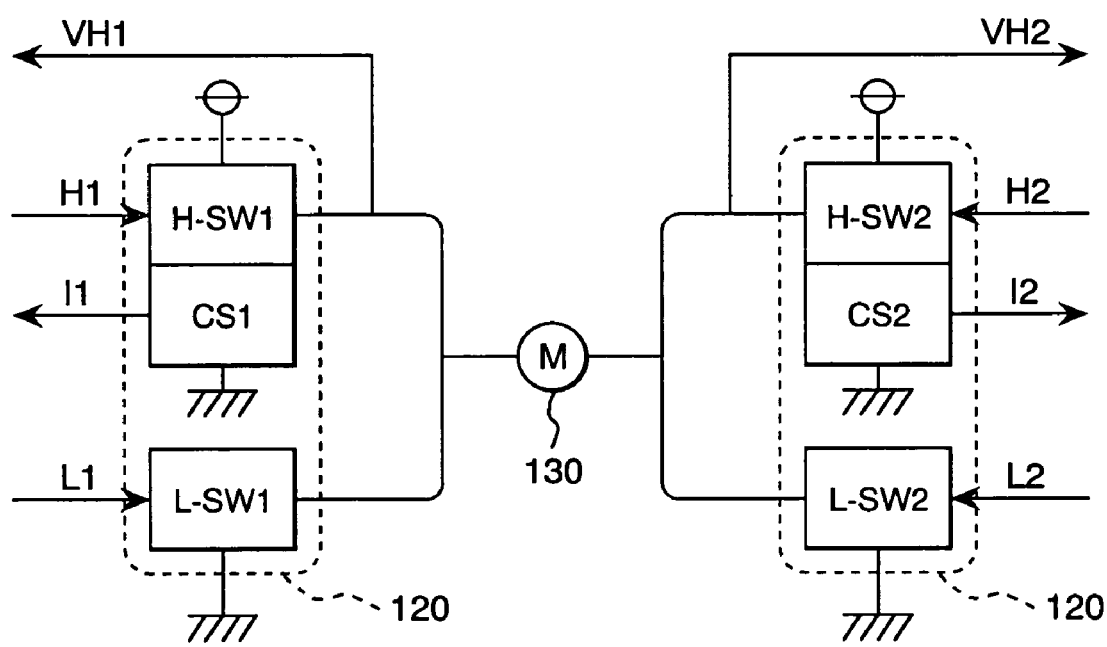
FIG. 8 is a block diagram of the motor driver used in the rotation control device of an embodiment of the present invention.

Here, by referring to FIG. 8, the first decision method of the rotation direction of the output shaft 140 will be explained. FIG. 8 is a block diagram of the motor driver used in the rotation control device of an embodiment of the present invention.

The motor driver 120 is composed of two high-side switches H-SW1 and H-SW2 and two low-side switches L-SW1 and L-SW2. The respective switches, on the basis of motor drive command signals H1, H2, L1, and L2 supplied from the controller 110, are turned on or off, thus a drive current flows through the motor 130 and the motor 130 is rotated clockwise and counterclockwise. Hereinafter, H and L are assumed respectively as a voltage of the motor drive command signal when each switch is turned on and a voltage of the motor drive command signal when each switch is turned off. Therefore, when the voltage of each motor drive command signal is H, each switch is turned on.

Here, taking notice of the motor drive command signals H1, H2, L1, and L2, the controller 110 outputs these signals to the motor driver 120, so that it can decide the state of each signal in an optional instance. The controller 110 decides the state of each signal, can decide the rotation angle of the magnet 150 in each angular area from Table 2, and can generate different data groups for the clockwise rotation and counterclockwise rotation.

TABLE 2

| Area decision | Criteria Rotational direction decision | Judgement result group name |
|---|---|---|
| V0_normalized > Vth | H1 == H | area_1_CW |
|  | H2 == H | area_1_CCW |
| V1_normalized > Vth | H1 == H | area_2_CW |
|  | H2 == H | area_2_CCW |
| V0_normalized < -Vth | H1 == H | area_3_CW |
|  | H2 == H | area_3_CCW |
| V1_normalized < -Vth | H1 == H | area_4_CW |
|  | H2 == H | area_4_CCW |

For example, in a certain output state, it is assumed that V0_normalized=0.7, and H1=H, and L2=L. In this case, from Table 2, the area is Area 1, and the magnet 150 rotates clockwise, so that the output state belongs to the group area_1_CW. Similarly in other cases, the controller 110 decides the area and rotational direction from Table 2 and can divide the output state of the outputs V0 normalized and V1_normalized into eight groups. In this embodiment, the output state is divided into eight groups using Table 2.

Further, other decision methods of the rotational direction will be explained below. In the second decision method, as shown in FIG. 8, when the high-side switch H-SW has a function of a current sensor CS, taking notice of the motor drive current, the rotational direction can be decided using Table 3 indicated below.

TABLE 3

| Area decision | Criteria Rotational direction decision | Judgement result group name |
|---|---|---|
| V0_normalized > Vth | I1 > Ith | area_1_CW |
|  | I2 > Ith | area_1_CCW |
| V1_normalized > Vth | I1 > Ith | area_2_CW |
|  | I2 > Ith | area_2_CCW |
| V0_normalized < -Vth | I1 > Ith | area_3_CW |
|  | I2 > Ith | area_3_CCW |
| V1_normalized < -Vth | I1 > Ith | area_4_CW |
|  | I2 > Ith | area_4_CCW |

For example, in a certain output state, it is assumed that V0_normalized=0.7 and the current I1 detected by the current sensor CS is equal to 10 A. The area is Area 1, and I1 is larger than a preset constant of Ith, so that it is found that the magnet 150 rotates clockwise, and the state of the outputs V0_normalized and V1 normalized belongs to the group area_1_CW. Ith is decided by the noise level of the current sensor CS, the winding resistance of the motor, and the supply voltage. Similarly in other cases, the controller 110 decides the area and rotational direction from Table 3 and can divide the output state of the sensor circuit 38 into eight groups.

In the third decision method, as shown in FIG. 6, when a function for monitoring the output voltages VH1 and VH2 of the motor driver 120 is provided, the rotational direction can be decided using Table 4 indicated below.

TABLE 4

| Area decision | Criteria Rotational direction decision | Judgement result group name |
|---|---|---|
| V0_normalized > Vth | VH1 > VHth | area_1_CW |
|  | VH2 > VHth | area_1_CCW |
| V1_normalized > Vth | VH1 > VHth | area_2_CW |
|  | VH2 > VHth | area_2_CCW |
| V0_normalized < -Vth | VH1 > VHth | area_3_CW |
|  | VH2 > VHth | area_3_CCW |
| V1_normalized < -Vth | VH1 > VHth | area_4_CW |
|  | VH2 > VHth | area_4_CCW |

For example, in a certain output state, when V0_normalized=0.7 and VH1=12 v, the area is Area 1, and VH1 is larger than a preset constant of VHth, so that it is found that the magnet 150 rotates clockwise. VHth is decided by the voltage detection range of the monitor function and the battery voltage and it may be 10 [v] or 5 [v]. Similarly in other cases, the controller 110 decides the area and rotational direction from Table 4 and can divide the state of the outputs V0_normalized and V1 normalized into eight groups.

Further, in the fourth decision method, the output of the magnetic sensor element 165 is differentiated by the time and from a combination thereof, the rotational direction of the magnet 150 is decided. FIG. 7 shows that in the area 1, when the magnet 150 rotates clockwise, V1_normalized increases. Namely, it has a positive inclination. Further, in the area 2, when the magnet 150 rotates clockwise, V0_normalized decreases. Namely, it has a negative inclination. Taking notice of the changing amounts of V1_normalized and V0_normalized, that is, time differential, the rotational direction can be decided from Table 5 indicated below. However, in Table 5, dV0 indicates time differential of V0_normalized and dV1 indicates time differential of V1_normalized.

TABLE 5

| Area decision | Criteria Rotational direction decision | Judgement result group name |
|---|---|---|
| V0_normalized > Vth | dV1 < 0 | area_1_CW |
|  | dV1 > 0 | area_1_CCW |
| V1_normalized > Vth | dV0 > 0 | area_2_CW |
|  | dV0 < 0 | area_2_CCW |
| V0_normalized < -Vth | dV1 < 0 | area_3_CW |
|  | dV1 > 0 | area_3_CCW |
| V1_normalized < -Vth | dV0 > 0 | area_4_CW |
|  | dV0 < 0 | area_4_CCW |

For example, in a certain output state, when V0_normalized=0.7 and dV1=+1, the area is Area 1, and dV1 has a positive value, so that it is found that the magnet 150 rotates clockwise. Similarly in other cases, the controller 110 decides the area and rotational direction from Table 5 and can divide the state of the outputs V0_normalized and V1_normalized into eight groups.

Next, for each angular area, the output x of the magnetic sensor element 165 used for compensation calculation is selected. For example, Table 6 shows that in the area 1, x=V1_normalized and in the area 2, x=V0_normalized.

TABLE 6

| Decision result group name | Output used for calculation x | Coefficient for compensation | | | |
|---|---|---|---|---|---|
| | | a | b | c | d |
| area_1_CW | V1_normalized | a_area_1_CW | b_area_1_CW | c_area_1_CW | d_area_1_CW |
| area_1_CCW | V1_normalized | a_area_1_CCW | b_area_1_CCW | c_area_1_CCW | d_area_1_CCW |
| area_2_CW | V0_normalized | a_area_2_CW | b_area_2_CW | c_area_2_CW | d_area_2_CW |
| area_2_CCW | V0_normalized | a_area_2_CCW | b_area_2_CCW | c_area_2_CCW | d_area_2_CCW |
| area_3_CW | V1_normalized | a_area_3_CW | b_area_3_CW | c_area_3_CW | d_area_3_CW |
| area_3_CCW | V1_normalized | a_area_3_CCW | b_area_3_CCW | c_area_3_CCW | d_area_3_CCW |
| area_4_CW | V0_normalized | a_area_4_CW | b_area_4_CW | c_area_4_CW | d_area_4_CW |
| area_4_CCW | V0_normalized | a_area_4_CCW | b_area_4_CCW | c_area_4_CCW | d_area_4_CCW |

Next, at Step S70 shown in FIG. 5, the host computer 200, in the respective groups, calculates compensation coefficients a, b, c, and d to minimize Formula 3 indicated below.

[Formula 3]

$$\int_{\theta=\theta\_start}^{\theta=\theta\_end} \{y_{offset} - (a \cdot x^3 + b \cdot x^2 + c \cdot x + d)\} d\theta \quad (3)$$

Here, yoffset indicates an offset value of the reference angle y of each group calculated from the output of the rotary encoder 210, and x indicates an output of the magnetic sensor element 165 used for compensation calculation in each group, and θ_start and θ_end respectively indicate a minimum angle and a maximum angle in each group.

In Table 6, the compensation coefficient in each group is indicated. For example, from the data of the group rotating clockwise in the area 1, the compensation coefficients a, b, c, and d calculated by Formula 3 are respectively stored as a=a_area1_CW, b=b_area1_CW, c=c_area1_CW, and d=d_area1_CW.

Further, from the data of the group rotating counterclockwise in the area 1, the compensation coefficients a, b, c, and d calculated by Formula 3 are respectively stored as a=a_area1_CCW, b=b_area1_CCW, c=c_area1_CCW, and d=d_area1_CCW.

Next, at Step S70 shown in FIG. 5, the host computer 200 transmits the calculated compensation coefficients and offset values to the shift controller 100 and stores them in the EEPROM 170 in each group.

Next, by referring to FIG. 9, the first compensation method by which the controller 110 obtains the angle of the output shaft 140 from the output of the magnetic sensor element 165 will be explained.

Figure 9:
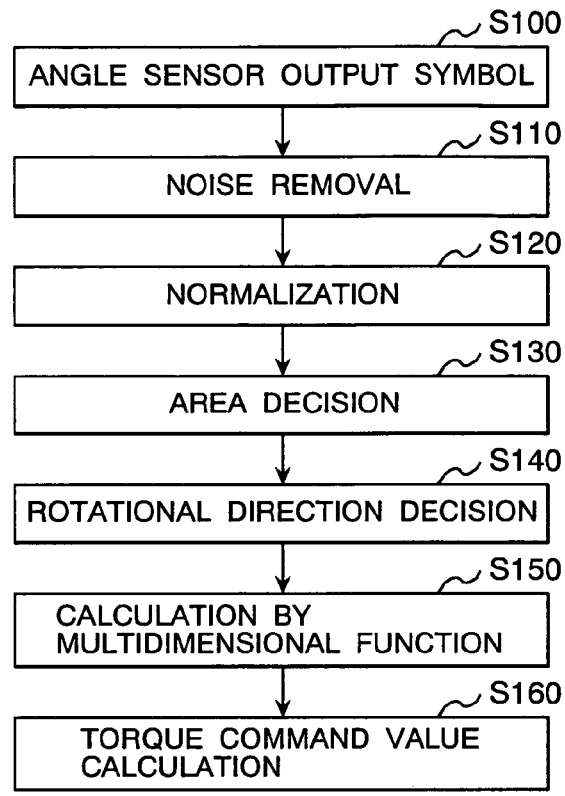
FIG. 9 is a flow chart showing the contents of the angle compensation process of the rotation control device of an embodiment of the present invention.

FIG. 9 is a flow chart showing the contents of the angle compensation process of the rotation control device of an embodiment of the present invention.

At Step S100, the controller 110, in the timing of calculation of the rotation angle of the output shaft 140, converts and fetches the output of the magnetic sensor element 165 from analog to digital. The A-D conversion timing is regular or irregular. On the other hand, the controller 110 reads data calculated at the time of calibration of a compensation coefficient preserved in the EEPROM 170 beforehand into the memory such as a RAM.

Next, at Step S110, the controller 110 removes noise from the A-D converted output of the magnetic sensor element 165 by a low-pass filter or an IIR or FIR filter.

Next, at Step S120, the controller 110, by the formulas (1) and (2) mentioned above, normalizes the output of the magnetic sensor element 165 and obtains V0_normalized and V1_normalized. Here, the maximum values V0max and V1max and minimum values V0min and V1min of the outputs V0 and V1 of the magnetic sensor element 165 of two systems are respectively the maximum values and minimum values of the outputs of the magnetic sensor element 165 preserved in the EEPROM 170 at the time of calibration.

Next, at Step S130, the controller 110, from the normalized outputs V0_normalized and V1_normalized, as indicated below, divides the rotation angle of the magnet 150 into an area 1 (area_1), an area 2 (area_2), an area 3 (area_3), and an area 4 (area_4) which are four angle areas.

Namely, the area 1 is a range of (V0_normalized>Vth), and the area 2 is a range of (V1_normalized>Vth), and the area 3 is a range of (V0_normalized≦−Vth), and the area 4 is a range of (V1_normalized≦−Vth).

Next, at Step S140, the controller 110, by any of the aforementioned methods for deciding the rotational direction of the output shaft 140 or a combination thereof, decides the rotational direction of the output shaft 140 and decides which group the data belongs to. Furthermore, the controller 110, on the basis of Table 6, decides the output of the magnetic sensor element 165 to be used in the angle calculation formula.

Next, at Step S150, the controller 110, from the compensation coefficients a, b, c, and d for each group which are stored in the RAM, calculates the angle θcalculation using the multidimensional function of Formula (4) indicated below.

$$\theta_{calculation} = a \cdot x^3 + b \cdot x^2 + c \cdot x + d \quad (4)$$

Further, x indicates an output of the magnetic sensor element 165 used for angle calculation in each group. For example, Table 6 shows that when a group rotates clockwise in the area 1, the group name is area_1_CW and x=V1_normalize. Further, the compensation coefficients a, b, c, and d are respectively a=a_area1_CW, b=b_area1_CW, c=c_area1_CW, and d=d_area1_CW. However, at the time of calibration, the offset value is subtracted, so that an actual rotation angle of the output shaft 140 is (θcalculation+offset).

As mentioned above, different compensation coefficients are used in the rotational direction of the rotation body, so that hysteresis appearing in the output of the magnetic sensor element 165 is canceled and the angle can be detected with high accuracy.

Next, at Step S160, the controller 110, so that the calculated rotation angle becomes the desired rotation angle θT, obtains a torque command value for rotating the motor 130 and outputs it to the motor driver 120.

Next, by referring to FIG. 10, a concrete angle compensation example will be explained.

Figure 10:
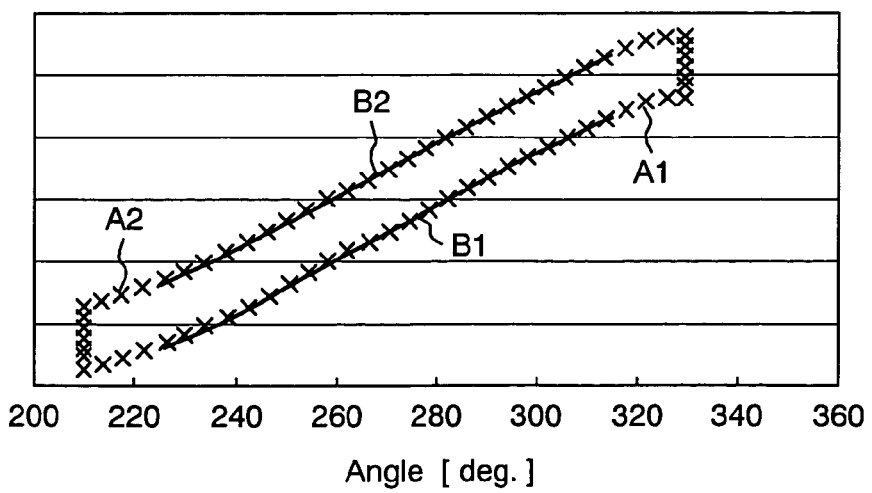
FIG. 10 is an illustration showing a concrete example of the angle compensation process of the rotation control device of an embodiment of the present invention.

FIG. 10 is an illustration showing a concrete example of the angle compensation process of the rotation control device of an embodiment of the present invention.

In the drawing, each mark x indicates V0_normalize when the magnet 150 is rotated clockwise and counterclockwise from 210° to 330°. The train of marks x indicated by numeral A1 indicates the sensor output when the magnet 150 is rotated clockwise and the train of marks x indicated by numeral A2 indicates the sensor output when the magnet 150 is rotated counterclockwise.

The rotation angle range includes the area 4 and in the area 4, using Formula (4), the angle is calculated as x=V0_normalize. Here, by the aforementioned method for calculating the angle using a different compensation coefficient depending on the rotational direction, at the time of clockwise rotation and counterclockwise rotation, curves of approximated outputs of the magnetic sensor element 165 can be separately obtained. An approximate curve B1 is a clockwise rotation angle calculated on the basis of the compensation coefficient belonging to area4_CW and an approximate curve B2 is a counterclockwise rotation angle calculated on the basis of the compensation coefficient belonging to area4_CCW.

Figure 11:
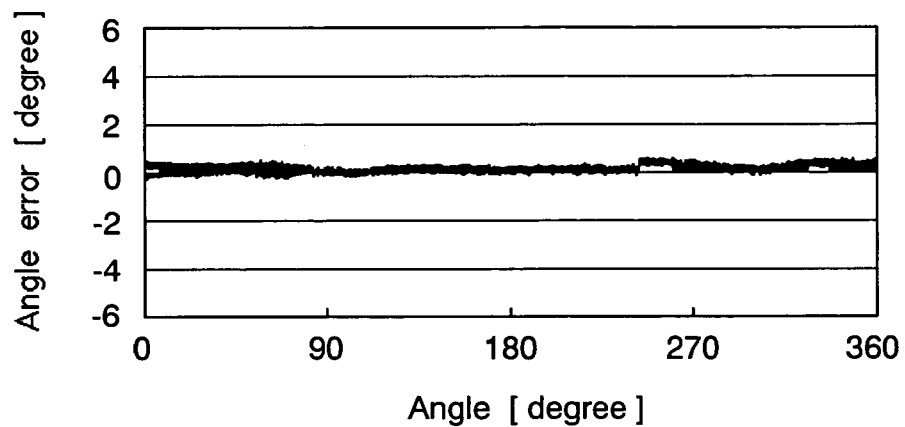
FIG. 11 is an illustration for the angle deviation of the rotation control device of an embodiment of the present invention.

FIG. 11 shows an angle deviation when by use of calibration for calculating a different compensation coefficient depending on the rotational direction, hysteresis is compensated and the angle is calculated. By calculating a different compensation coefficient depending on the rotational direction, the angle deviation can be reduced to ±0.2°. The angle deviation not compensated is about ±2°.

When switching from two-wheel drive to high-speed four-wheel drive by the shift controller 100, the angle of the output shaft is changed from 0° to 90°. However, at this time, when there is an angle error of ±2° as usual, the switching may fail and the control accuracy is reduced. However, like this embodiment, when the angle error is ±0.2°, the switching succeeds and the control accuracy can be improved.

Next, the second compensation method by which the controller 110 obtains the angle of the output shaft 140 from the output of the magnetic sensor element 165 will be explained.

For example, in the example shown in FIG. 7, within the range of the angle area 2 and angle area 4, when V0_normalize can be regarded as a linear line for the angle or within the range of the angle area 3 and angle area 1, when V1_normalize can be regarded as a linear line for the angle, by replacing the formula (3) with the formula (5) indicated below, that is, the linear approximate formula, the compensate coefficients c and d are calculated.

$$\int_{\theta=\theta\_start}^{\theta=\theta\_end} \{y_{offset} - (c \cdot x + d)\} d\theta \quad (5)$$

The calculated compensation coefficients c and d are preserved in the EEPROM 170 and from the output of the magnetic sensor element 165 and the compensation coefficients c and d, in the same way as with the aforementioned compensation method, the angle is compensated and calculated. However, in this case, the formula (4) is replaced with θcalculation=c·x+d and is calculated.

Next, by referring to FIG. 12, the third compensation method by which the controller 110 obtains the angle of the output shaft 140 from the output of the magnetic sensor element 165 will be explained.

Figure 12:
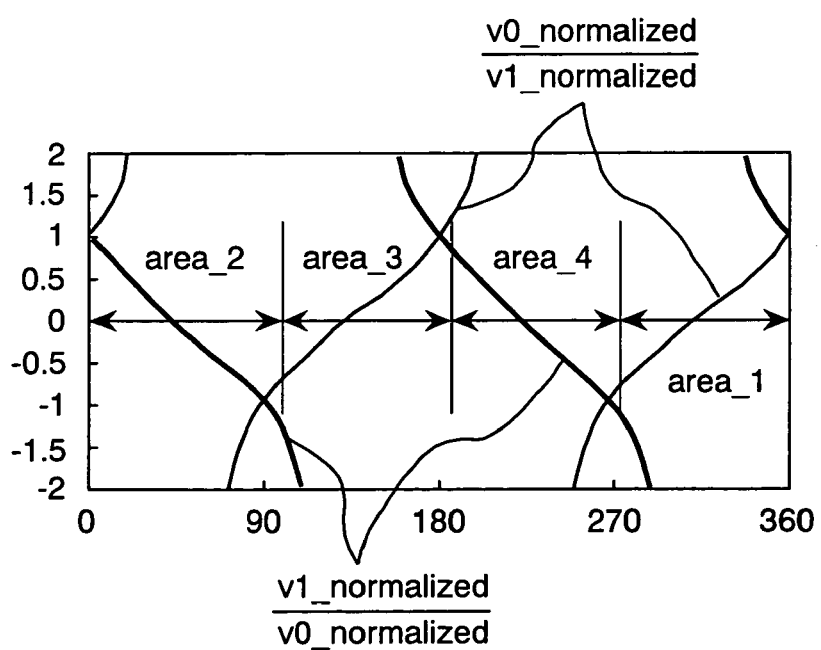
FIG. 12 is an illustration for the third angle compensation process of the rotation control device of an embodiment of the present invention.

FIG. 12 is an illustration for the third angle compensation process of the rotation control device of an embodiment of the present invention.

FIG. 12 is a graph showing the relationship of values obtained by mutually dividing the rotation angle of the magnet 150 and the outputs of the magnetic sensor element 165 of two systems. In the aforementioned compensation method, each x of the formulas (3) and (4) is set to x=(V0_normalize/V1_normalize) in the areas 1 and 3 and is replaced and approximated with x=(V1_normalize/V0_normalize) in the areas 2 and 4, thus compensation coefficients are obtained and compensation calculations are carried out.

Next, the fourth compensation method by which the controller 110 obtains the angle of the output shaft 140 from the output of the magnetic sensor element 165 will be explained.

In this example, when hysteresis does not depend on the rotation angle of the magnet 150 and is regarded as constant (θh), from the outputs of the magnetic sensor element 165 at the time of clockwise rotation and counterclockwise rotation, the rotational direction is not distinguished, and a set of compensation coefficients is calculated in each area, and from the compensation coefficients, the rotation angle of the magnet 150 is calculated. In the calculated angle, since the output of the magnetic sensor element 165 at the time of clockwise rotation and the output of the magnetic sensor element 165 at the time of counterclockwise rotation are compensated simultaneously, an angle deviation of a half of the hysteresis appears at the time of both clockwise rotation and counterclockwise rotation. Therefore, the calculated angle θcalculation is set to θcalculation=(θcalculation−(θh/2)) at the time of clockwise rotation and is set to θcalculation=(θcalculation+(θh/2)) at the time of counterclockwise rotation, and the effect of hysteresis is subtracted from or added to the calculated angle.

As explained above, according to this embodiment, different compensation coefficients depending on the rotational direction of the rotation body are used, and hysteresis appearing in the output of the magnetic sensor element is canceled, and the angle can be detected with high accuracy. Further, since the angle can be detected with high accuracy, the angle control accuracy can be improved.

According to the present invention, without being affected by hysteresis characteristics, errors in the angle detected value can be reduced.

Further, the rotation control accuracy can be improved.

The meaning of reference signs are as follows:100: Shift controller, 110: Controller, 120: Motor driver, 130: Motor, 140: Output shaft, 150: Magnet, 160: Output circuit, 165: Sensor element, 170: EEPROM.

What is claimed is:

1. An angular position sensor comprising:
   a sensor element for detecting changes of magnetic field strength of a magnet that rotates in synchronization with a rotating body whose angular position is to be detected; and
   compensation means compensating hysteresis characteristics of an output of the sensor element in both a clockwise and a counterclockwise rotation of the rotation body;
   wherein different coefficients, approximated by different functions are used for said compensation, when said rotation body rotates clockwise and counterclockwise.

2. An angular position sensor according to claim 1, wherein said compensation means compensates said outputs of said sensor element with coefficients for compensation approximated by different polynomial functions.

3. An angular position sensor according to claim 1, wherein said compensation means compensates said outputs of said sensor element with coefficients for compensation approximated by using different cubic functions.

4. An angular position sensor according to claim 1, wherein:
said sensor element has outputs of two systems; and
said compensation means compensates said outputs of said sensor element with coefficients for compensation when said outputs of said two systems are divided and approximated using a polynomial function.

5. An angular position sensor according to claim 1, wherein said compensation means compensates said outputs of said sensor element using approximated sensor outputs with the same functions and compensated values different for each rotational direction.

6. An angular position sensor comprising:
a motor for driving a rotation body;
a sensing element for detecting changes of magnetic field strength of a magnet that rotates in synchronization with said rotation body for detecting an angular position of said rotation body;
control means for controlling said motor so that a rotation angle of said rotation body detected by said sensor element becomes a desired angle; and
compensation means compensating hysteresis characteristics of an output of the sensor element in both a clockwise and a counterclockwise rotation of the rotation body;
wherein different coefficients, approximated by different functions, are used for said compensation when said body rotates clockwise and counterclockwise.

7. An angular position sensor according to claim 6, wherein said compensation means compensates said outputs of said sensor element using coefficients for compensation approximated by using a linear function.

8. A position control device according to claim 6, wherein said control means judges a rotational direction by a command value for motor drive for rotation of said rotation body.

9. A position control device according to claim 6, wherein said control means judges a rotational direction by an output current of a motor driver circuit for driving rotation of said rotation body.

10. A position control device according to claim 6, wherein said control means judges a rotational direction by an output voltage of a motor driver circuit for driving rotation of said rotation body.

11. A position control device according to claim 6, wherein said control means judges a rotational direction by a change with time of an output signal of said sensor element.

12. An angular position sensor according to claim 6, wherein said compensation means compensates said outputs of said sensor e element with coefficients for compensation approximated by using different cubic functions.

13. An angular position sensor according to claim 6, wherein said compensation means compensates said outputs of said sensor element with coefficients for compensation approximated by using different nominal functions.

14. An angular position sensor according to claim 6, wherein said compensation means compensates said outputs of said sensor element with coefficients for compensation approximated by using different linear functions.

* * * * *